United States Patent [19]

Murakami

[11] Patent Number: 5,567,545
[45] Date of Patent: Oct. 22, 1996

[54] BATTERY HOUSING DEVICE WITH MOVABLE ELECTRICAL CONTACT MEMBER

[75] Inventor: Hiroshi Murakami, Utsunomiya, Japan

[73] Assignee: Nikon Corporation, Tokyo, Japan

[21] Appl. No.: 515,169

[22] Filed: Aug. 15, 1995

[30] Foreign Application Priority Data

Sep. 7, 1994 [JP] Japan ................................ 6-214078

[51] Int. Cl.⁶ ............................. H01M 2/02; H01M 2/10
[52] U.S. Cl. .............................. 429/163; 429/96; 429/97; 429/99; 429/100; 429/175
[58] Field of Search .................................. 429/96, 97, 99, 429/100, 163, 175

[56] References Cited

U.S. PATENT DOCUMENTS

| | | | |
|---|---|---|---|
| 3,881,961 | 5/1975 | Nation | 429/97 |
| 4,690,878 | 9/1987 | Nakamura | 429/1 |
| 4,784,926 | 11/1988 | Sato | 429/96 |
| 4,965,141 | 10/1990 | Suzuki | 429/9 |

Primary Examiner—Stephen Kalafut
Assistant Examiner—Richard H. Lilley, Jr.

[57] ABSTRACT

A battery housing device which includes a battery housing chamber which houses a battery, and a cover for closing the battery housing chamber. The cover includes an electrically conductive plate and a spring plate. The electrically conductive plate electrically contacts either the positive electrode or the negative electrode of a battery housed in the chamber. The spring plate is secured to the cover and supports the electrically conductive plate to be movable in a direction linking the positive electrode and the negative electrode of the battery together, to compensate for movement of the battery inside the chamber. The electrically conductive plate can have a protuberance which allows the electrically conductive plate to electrically contact the positive electrode when the battery is correctly inserted into the chamber, but which will not allow the electrically conductive plate to electrically contact the negative electrode of the battery when the battery is incorrectly inserted into the chamber.

15 Claims, 10 Drawing Sheets

BATTERY HOUSING DEVICE WITH MOVABLE ELECTRICAL CONTACT MEMBER

BACKGROUND OF THE INVENTION

1. Field of the Invention

The present invention is related to a battery housing device which includes a battery housing chamber and a contact member for electrically contacting a battery contained inside the battery housing chamber. More particularly, the present invention is related to a battery housing device with a movable contact member for maintaining electrical contact with a battery contained inside the battery housing chamber even when the battery position is shifted.

2. Description of the Related Art

FIG. 1 is a diagram illustrating a perspective view of a conventional battery housing device. As illustrated in FIG. 1, a battery housing chamber 101 houses batteries 113 and 114. A battery cover 110 is mounted via a rotatable axis to open and close battery housing chamber 101. A continuity plate 112 is secured to battery cover 110. Continuity plate 112 functions as a contact member and provides contact for maintaining serial electrical continuity between batteries 113 and 114. A securing member 109 is between battery housing chamber 101 and battery cover 110. Securing member 109 secures battery cover 110 to battery housing chamber 101 and provides axis support for battery cover 110. A notched piece 102 is on the upper part of battery housing chamber 101 and functions as a negative contact point for contacting the negative electrode of battery 113. Notched piece 102 is connected to a lead line 104, and passes through a spring 106. Spring 106 is sandwiched between a base plate 108 and battery housing chamber 101 and is movable in the direction 200 linking the positive and negative electrodes of each battery (hereinafter referred to as the "thrust" direction). A notched piece 103 is on the upper part of battery housing chamber 101 and functions as a positive contact point for contacting the positive electrode of battery 114. Notched piece 103 is connected to a lead line 105, and passes through a spring 107. Spring 107 is sandwiched between base plate 108 and battery housing chamber 101 and is movable in the thrust direction.

If the positive and negative electrodes of battery 114 are reversed so that the negative electrode of battery 114 is incorrectly inserted first into battery housing chamber 101, a nonconductive portion on the perimeter of the negative electrode of battery 114 will contact the perimeter of notched piece 103, and an electrical contact between notched piece 103 and battery 114 will not be made.

FIG. 2 is a diagram illustrating a vertical cross section along line I—I of the conventional battery housing device of FIG. 1. In FIG. 2, battery 113 is positioned with a positive electrode 210 in the bottom of the figure, and a negative electrode 220 in the top of the figure. A fastening member 111 fastens battery cover 110 to securing member 109 from a rotatable state. Continuity plate 112 is secured to battery cover 110.

FIG. 3 is a diagram illustrating a vertical cross section along line I—I of the conventional battery housing device of FIG. 1, wherein batteries are incorrectly loaded to be upside down. Therefore, in FIG. 3, the positive electrode 210 is in the top of the figure, and the negative electrode 220 is in the bottom of the figure. As illustrated in FIG. 3, negative electrode 220 of battery 113 cannot make contact with continuity plate 112 because of protuberances 110a and 110b of battery cover 110.

Battery housing chamber 101 is made large in consideration of variations in the production size of batteries. Therefore, batteries may move inside of battery housing chamber 101 when battery housing chamber 101 is shocked or vibrated. As a result of such movement of the batteries, the electrical contact between continuity plate 112 and battery 113 may undesireably be interrupted.

SUMMARY OF THE INVENTION

Accordingly, it is an object of the present invention to provide a battery housing device with a battery housing chamber that is resistant to shock and vibration.

It is a further object of the present invention to provide a battery housing device with a battery housing chamber which maintains electrical contact between a battery and a contact member when the battery shifts inside the battery housing chamber.

Objects of the present invention are achieved by providing a battery housing device including a battery housing chamber having an opening and which houses a battery, and a cover for closing the opening in the battery housing chamber. The cover includes (a) a contact member for electrically contacting the electrode of a battery housed in the chamber, and (b) an elastic member secured to the cover and supporting the contact member to be movable to compensate for movement of the battery inside the chamber.

Objects of the present invention are also achieved by providing a battery housing device having a battery housing chamber which houses more than one battery, and a cover for closing a battery housing chamber. Each battery has a positive electrode and a negative electrode and a direction linking the positive electrode to the negative electrode of a respective battery housed in the chamber is parallel to the direction linking the positive electrode to the negative electrode of the other batteries housed in the chamber. The cover includes (a) an electrically conductive plate for electrically contacting either the positive electrode or the negative electrode of each battery housed in the chamber to electrically connect each battery together, and (b) a spring plate secured to the cover and supporting the electrically conductive plate to be movable in the direction linking the positive electrode and the negative electrode of each battery together, to compensate for movement of the batteries inside the chamber.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
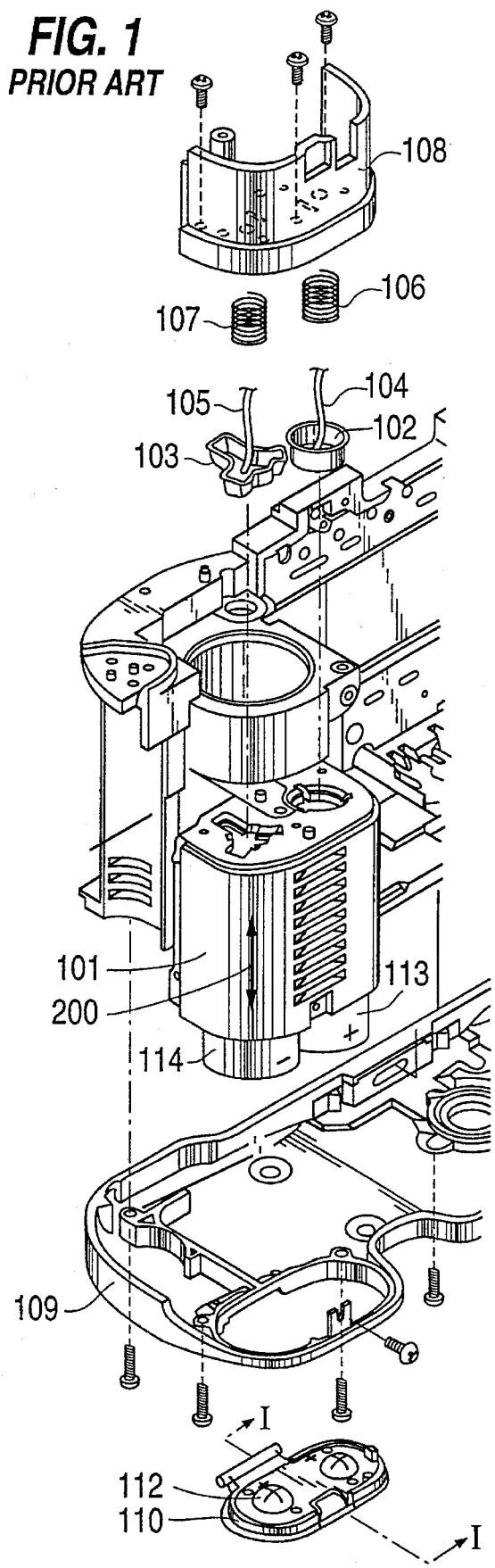
FIG. 1 (prior art) is a diagram illustrating a perspective view of a conventional battery housing device.
Figure 2:
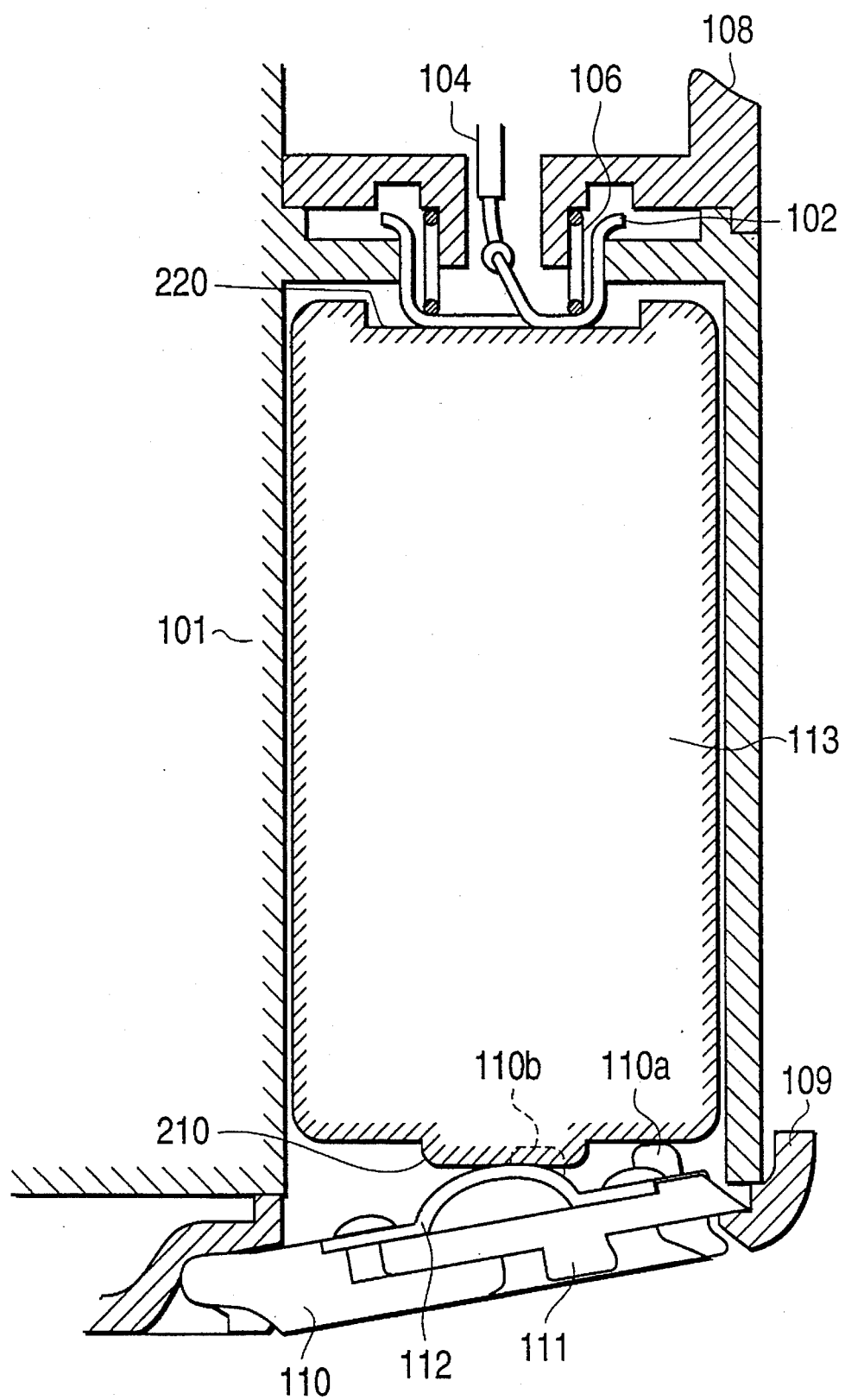
FIG. 2 (prior art) is a diagram illustrating a vertical cross section along line I—I of the battery housing device of FIG. 1.
Figure 3:
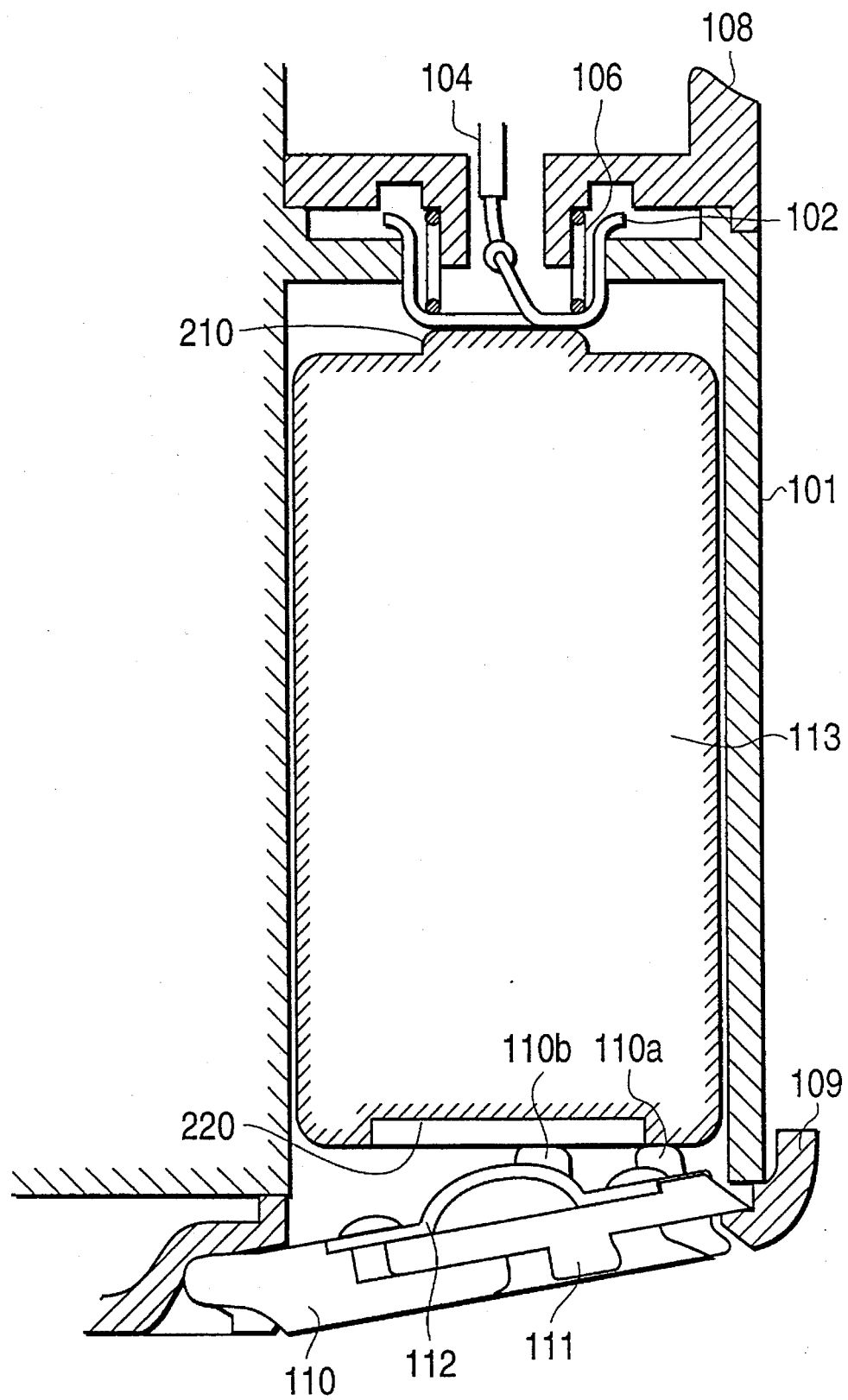
FIG. 3 (prior art) is a diagram illustrating a vertical cross section along line I—I of the battery housing device of FIG. 1, wherein batteries are incorrectly loaded to be upside down.

Reference will now be made in detail to the present preferred embodiments of the present invention, examples of which are illustrated in the accompanying drawings, wherein like reference numerals refer to like elements throughout.

Figure 4:
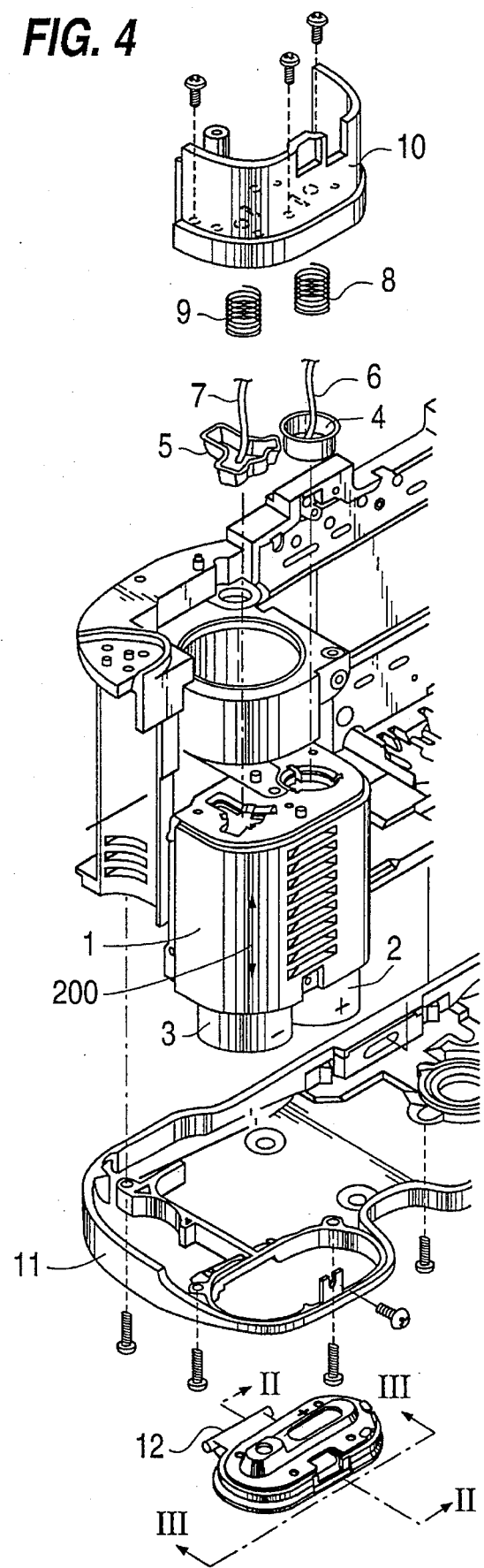
FIG. 4 is a diagram illustrating an exploded, perspective view of a battery housing device according to an embodiment of the present invention.

FIG. 4 is a diagram illustrating a perspective view of a battery housing device according to an embodiment of the present invention. As illustrated in FIG. 4, a battery housing chamber 1 constrains batteries 2 and 3, and leaves contact point surfaces of batteries 2 and 3 accessible. A securing member 11 rotatably supports a battery cover 12 to be rotatable about an axis, and secures battery cover 12 to battery housing chamber 1. Then, battery cover 12 is rotated about its rotating axis to uncover an opening in securing member 11. Batteries 2 and 3 are loaded into battery housing chamber 1 through the opening in securing member 11. Battery cover 12 then closes the opening in securing member 11 to enclose batteries 2 and 3 in battery housing chamber 1. A notched piece 4 is connected to a lead line 6 and is positioned between a base plate 10 and battery housing chamber 1. Notch piece 4 is movable in the thrust direction 200 through a coil spring 8. Similarly, a notched piece 5 is connected to a lead line 7 and is positioned between base plate 10 and battery housing chamber 1. Notch piece 5 is movable in the thrust direction 200 through a coil spring 9. Lead lines 6 and 7 are connected to conventional mechanisms (not illustrated) for driving various devices (not illustrated) powered by batteries 2 and 3.

Figure 5:
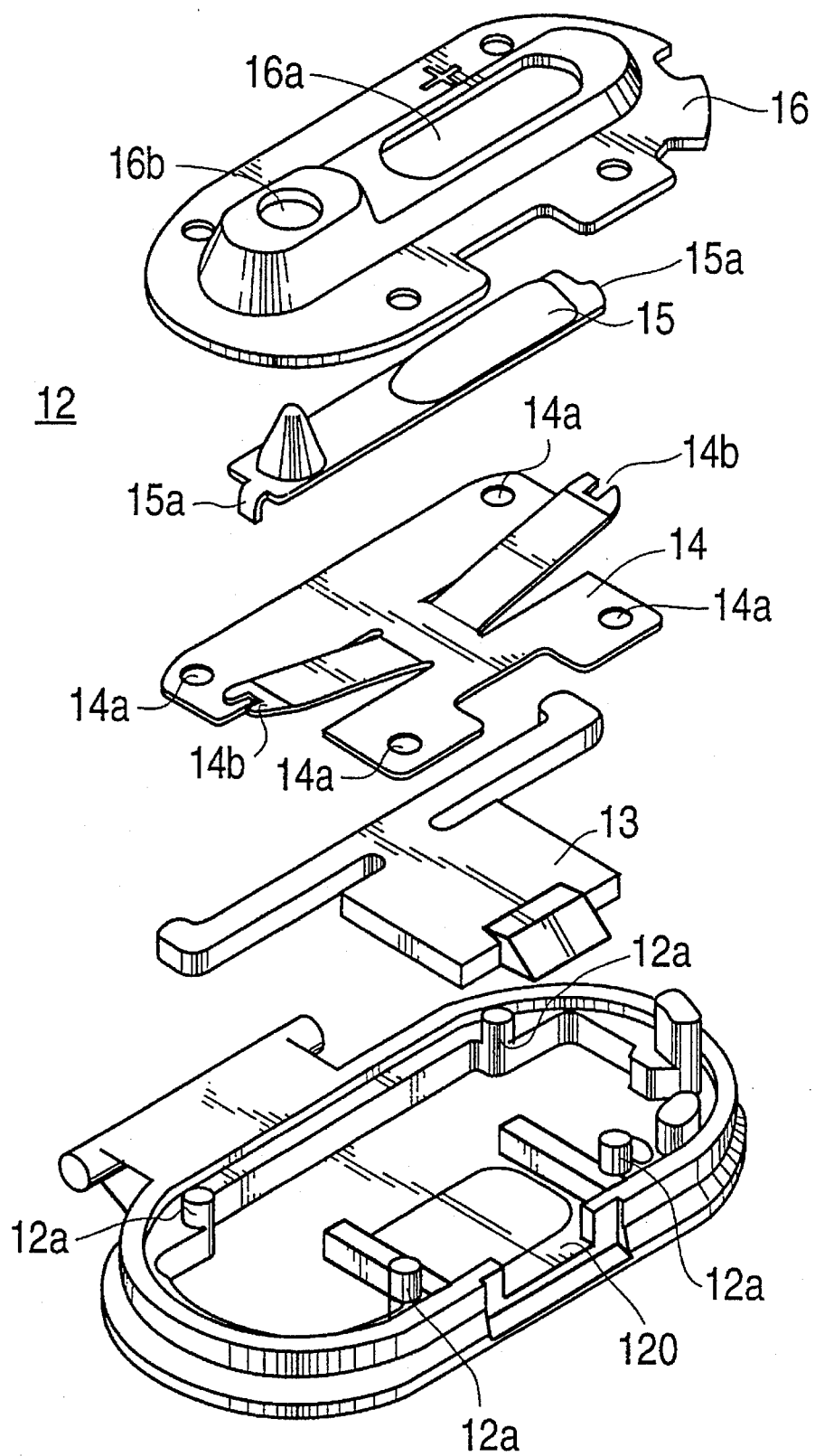
FIG. 5 is a diagram illustrating an exploded, perspective view of a battery cover for a battery housing device, according to an embodiment of the present invention.

FIG. 5 is a diagram illustrating a perspective view of battery cover 12 of the battery housing device, according to an embodiment of the present invention. As illustrated in FIG. 5, battery cover 12 includes a battery cover base member 120 having a fastening member 13 inserted therein for fastening battery cover 12 to securing member 11. Battery cover 12 also includes a plate spring 14 having holes 14a which are inserted into bosses 12a of battery cover base member 120. A continuity plate 15 of battery cover 12 has protuberances 15a which are inserted into keys 14b of plate spring 14. Continuity plate 15 is secured to battery cover base member 120. A conductive retaining plate 16 of battery cover 12 restrains the movement of continuity plate 15 in the bending direction of plate spring 14. Retaining plate 16 has holes 16a and 16b to allow portions of continuity plate 15 to extend therethrough. Various components may be caulked together, but they may also be fastened, for example, with screws or snap fit members. Also, plate spring 14 is preferably a separate member from continuity plate 15, but a continuity plate and a plate spring may be formed as a single member by deepening the lead ends of the plate spring.

Figure 6:
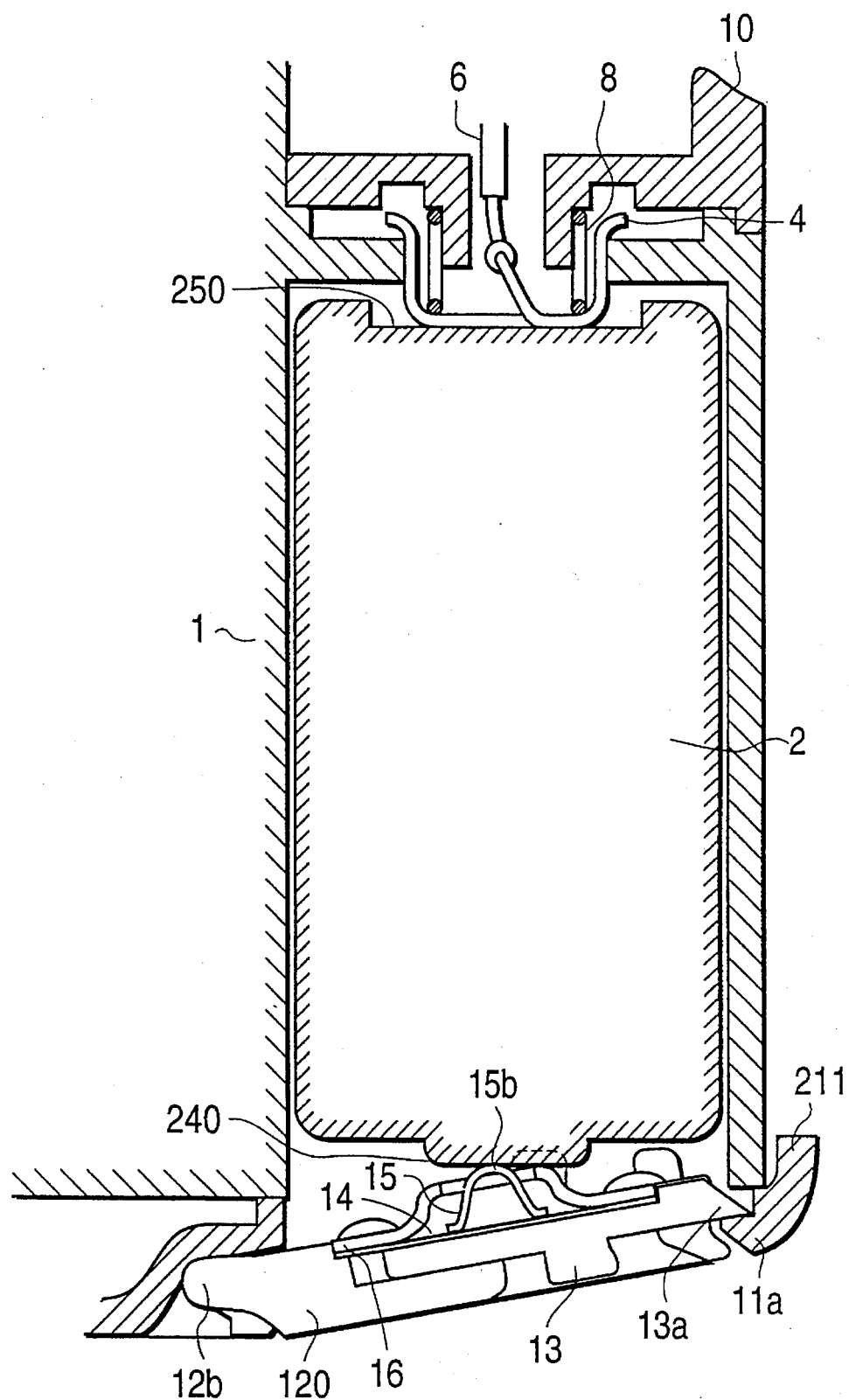
FIG. 6 is a diagram illustrating a vertical cross section along line II—II of the battery housing device of FIG. 4, according to an embodiment of the present invention.

FIG. 6 is a diagram illustrating a vertical cross section along line II—II of the battery housing device of FIG. 4, according to an embodiment of the present invention. As illustrated in FIG. 6, battery 2 has a positive electrode 240 and a negative electrode 250. Battery cover base member 120 is rotatably centered on axis part 12b so that battery cover 12 can be opened and closed to install and remove battery 2. A tab 13a is the lead end of fastening member 13 and fastens to a protuberance 11a of a fastening member 211. Tab 13a may be released from protuberance 11a by sliding fastening member 13.

As illustrated in FIG. 6, positive electrode 240 of battery 2 contacts protuberance 15b of continuity plate 15. Positive electrode 240 of battery 2 also contacts retaining plate 16. Therefore, battery 2 makes electrical contact at multiple places, thereby improving conductivity by increasing contact surface area. Even if retaining plate 16 is separated from battery 2 by movement of battery 2 in the thrust direction due to vibration, shock or similar force, continuity plate 15 maintains contact with battery 2 because continuity plate 15 is pushed upward by plate spring 14. Moreover, the weight of battery 2 and the weight of coil spring 8 are supported by retaining plate 16. Therefore, plate spring 14 should have a sufficient amount of force to follow the movement of battery 2. Further, as illustrated in FIG. 5, negative electrode 250 of battery 2 contacts notched piece 4. Notched piece has a relatively wide length to maintain good continuity with negative electrode 250. Coil spring 8 suppresses movement of battery 2 caused by dimensional variations of the battery, vibration, shock or other forces.

Figure 7:
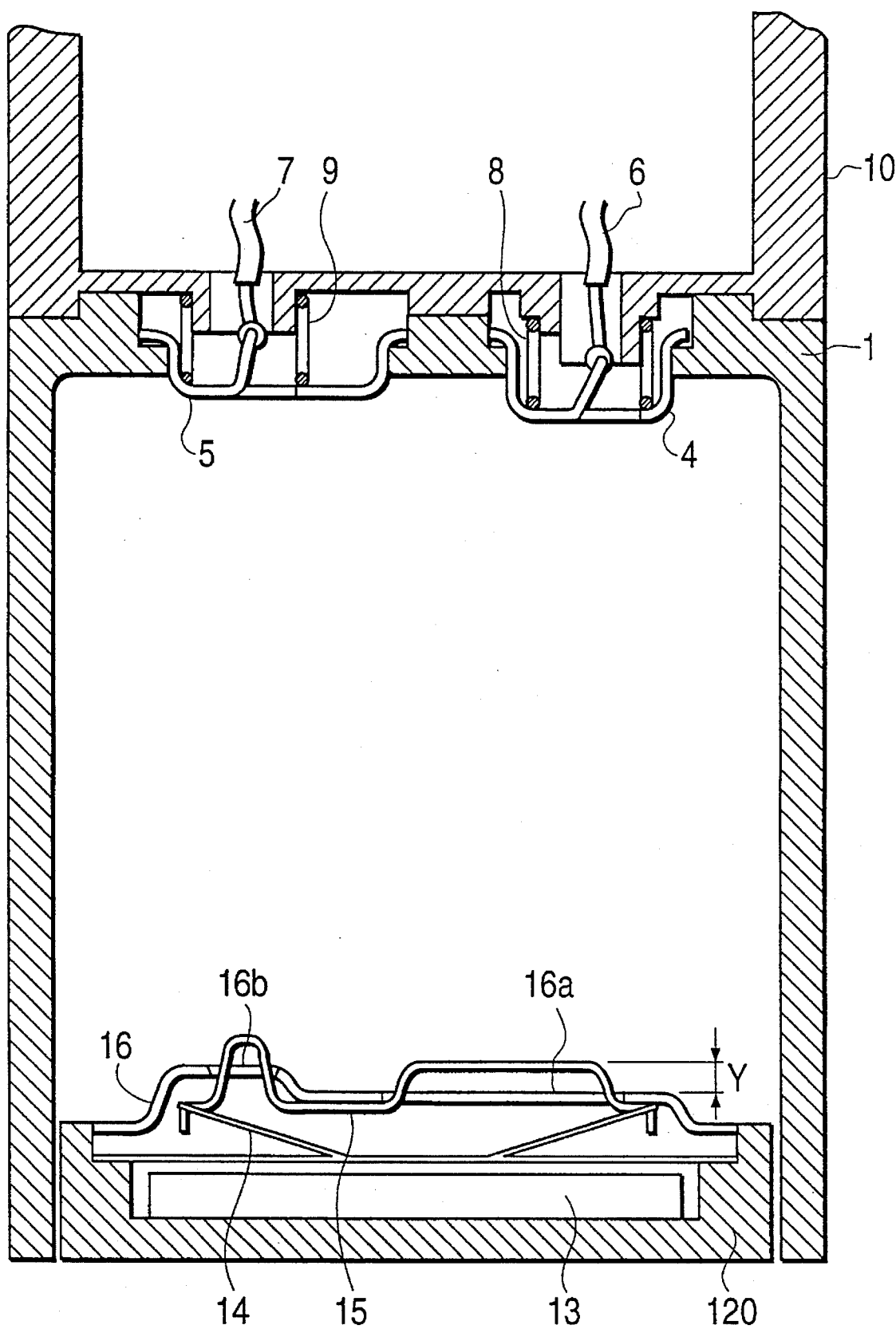
FIG. 7 is a diagram illustrating a vertical cross section along line III—III of the battery housing device of FIG. 4, wherein no batteries are loaded into the battery housing device.

FIG. 7 is a diagram illustrating a vertical cross section along line III—III of the battery housing device of FIG. 4, wherein no batteries are loaded into the battery housing device. In FIG. 7, continuity plate 15 is pressed up by plate spring 14, and the movement of continuity plate 15 in the thrust direction is restrained by retaining plate 16. Continuity plate 15 is pushed by plate spring 14 to extend through holes 16a and 16b of retaining plate 16. Continuity plate 15 extends through hole 16a of retaining plate 16 by an amount of protuberance Y. Thus, the amount of protuberance Y represents the range which spring plate 14 can move in the thrust direction.

Figure 8:
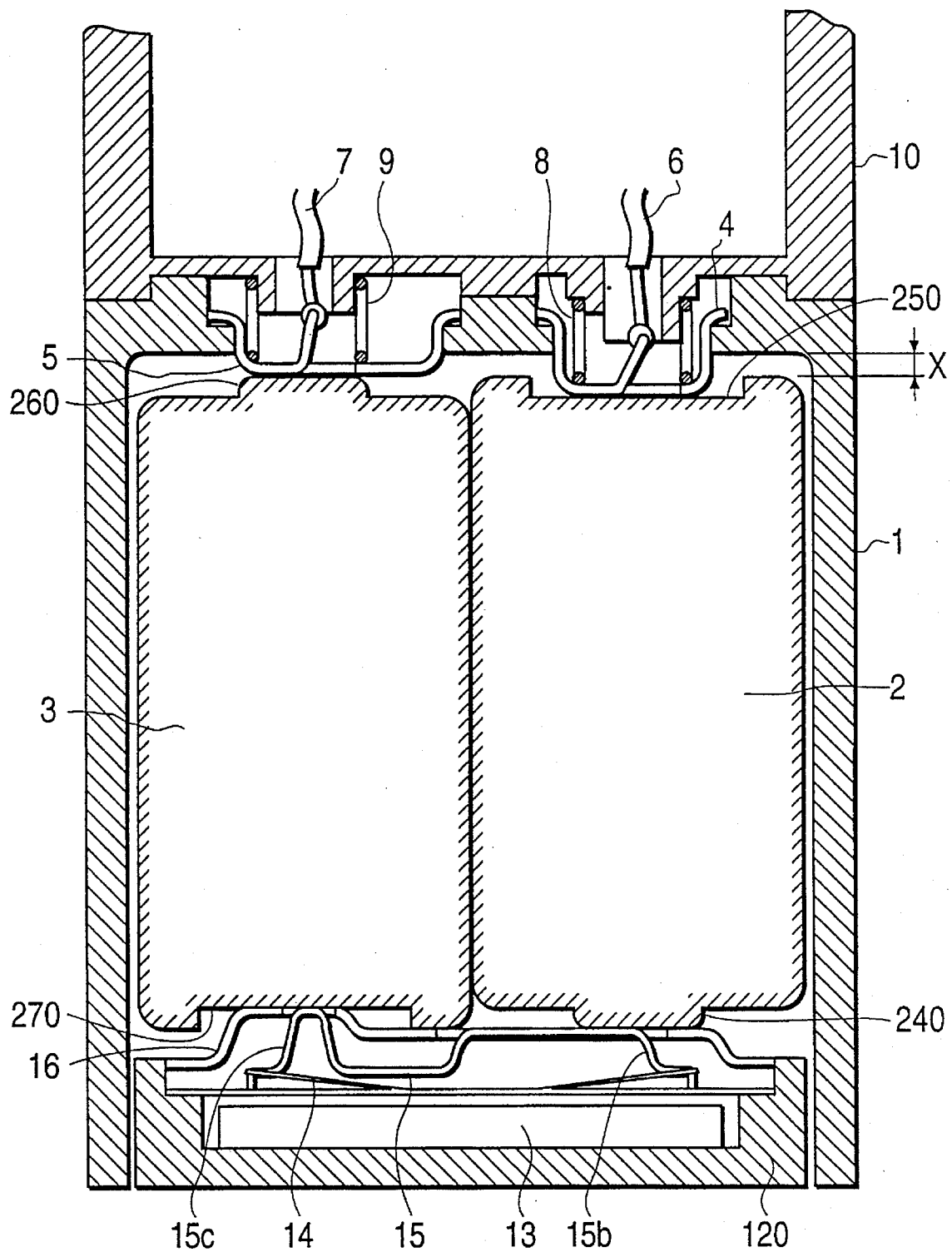
FIG. 8 is a diagram illustrating a vertical cross section along line III—III of the battery housing device of FIG. 4, wherein batteries are properly loaded into the battery housing device.

FIG. 8 is a diagram illustrating a vertical cross section along line III—III of the battery housing device of FIG. 4, wherein batteries are properly loaded into the battery housing device. As illustrated in FIG. 8, battery 2 has a positive electrode 240 and a negative electrode 250, and battery 3 has a positive electrode 260 and a negative electrode 270. Positive electrode 240 of battery 2 contacts retaining plate 16. Also, protuberance 15b of continuity plate 15 contacts positive electrode 240 of battery 2 by pressing up in the thrust direction due to the force of plate spring 14. The force of coil spring 8 presses notched piece 4 against negative electrode 250 of battery 2 so that notched piece 4 contacts negative electrode 250.

Similarly, negative electrode 270 of battery 3 contacts retaining plate 16. Also, protuberance 15c of continuity plate 15 contacts negative electrode 270 of battery 3 by pressing up in the thrust direction via the force of plate spring 14. The force of coil spring 9 presses notched piece 5 against positive electrode 260 of battery 3 so that notched piece 5 contacts positive electrode 260. A gap X is provided between battery 2 and battery housing chamber 1 to accommodate fluctuations in the dimensions of batteries caused by production of the batteries.

Figure 9:
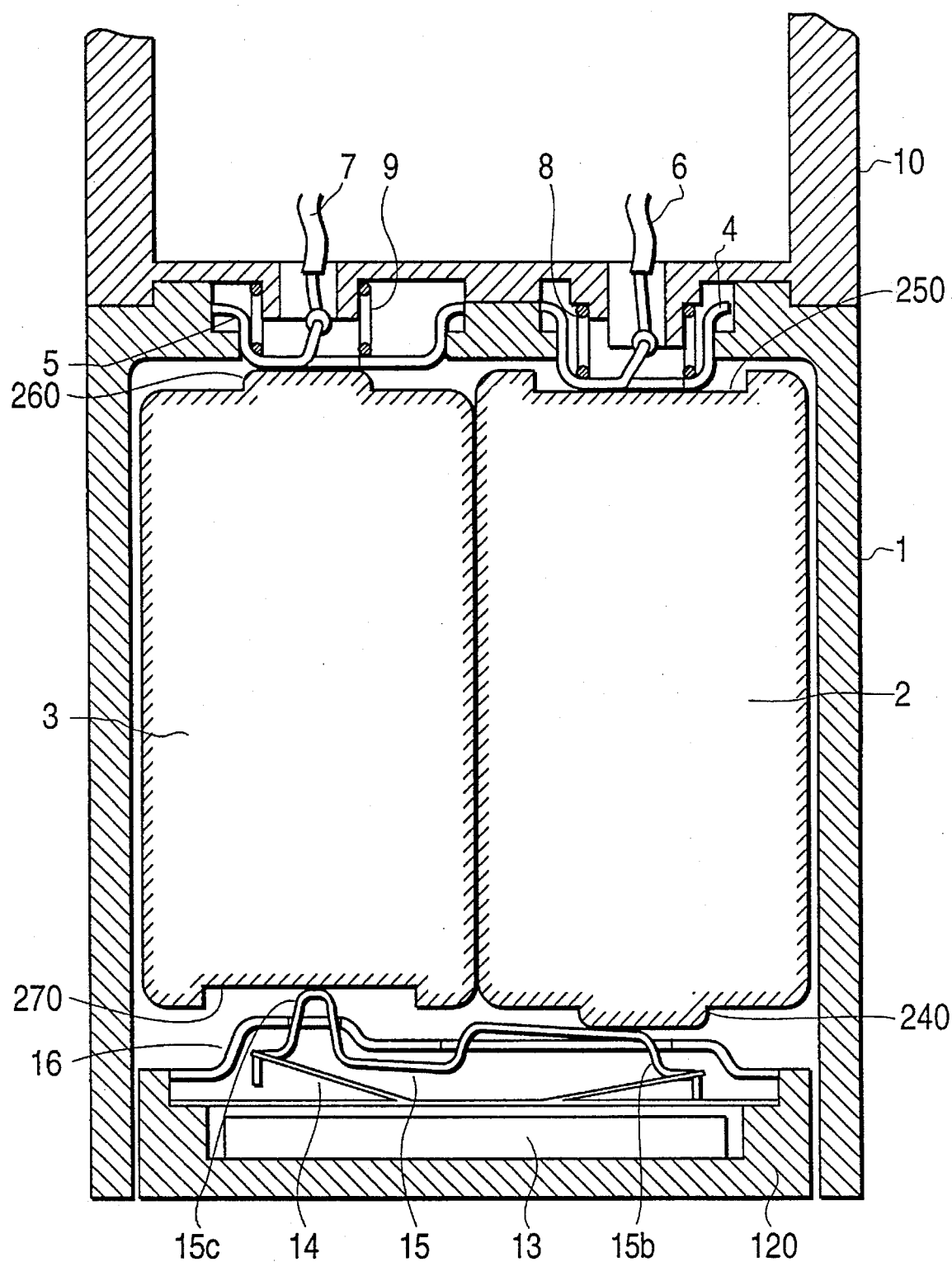
FIG. 9 is a diagram illustrating a vertical cross section along line III—III of the battery housing device of FIG. 4, wherein the batteries have moved inside the battery housing device from the battery positions illustrated in FIG. 8.

FIG. 9 is a diagram illustrating a vertical cross section along line III—III of the battery housing device of FIG. 4, wherein the batteries have moved inside the battery housing device from the battery positions illustrated in FIG. 8. Such movement of the batteries is typically caused by vibration or shock affecting the battery housing chamber. In FIG. 9, battery 2 has moved to a relatively unstable position. However, spring plate 14 presses protuberance 15b of spring plate 15 in the thrust direction to maintain electrical contact between protuberance 15b of continuity plate 15 and positive electrode 240 of battery 2. Moreover, the negative electrode 250 of battery 2 compresses coil spring 8, and notched piece 4 maintains electrical contact with negative electrode 250 of battery 2. Similarly, plate spring 14 presses protuberance 15c of continuity plate 15 in the thrust direction to cause protuberance 15c to contact and maintain continuity with negative electrode 270 of battery 3. Coil spring 9 is compressed by positive electrode 260 of battery 3, and positive electrode 260 maintains contact with notched piece 5.

Gap X of FIG. 8 is preferably smaller than the amount of protuberance Y of continuity plate 15 in FIG. 7. As a result, continuity plate 15 follows the movement of batteries 2 and 3, even if batteries 2 and 3 are shifted from vibration or shock.

Figure 10:
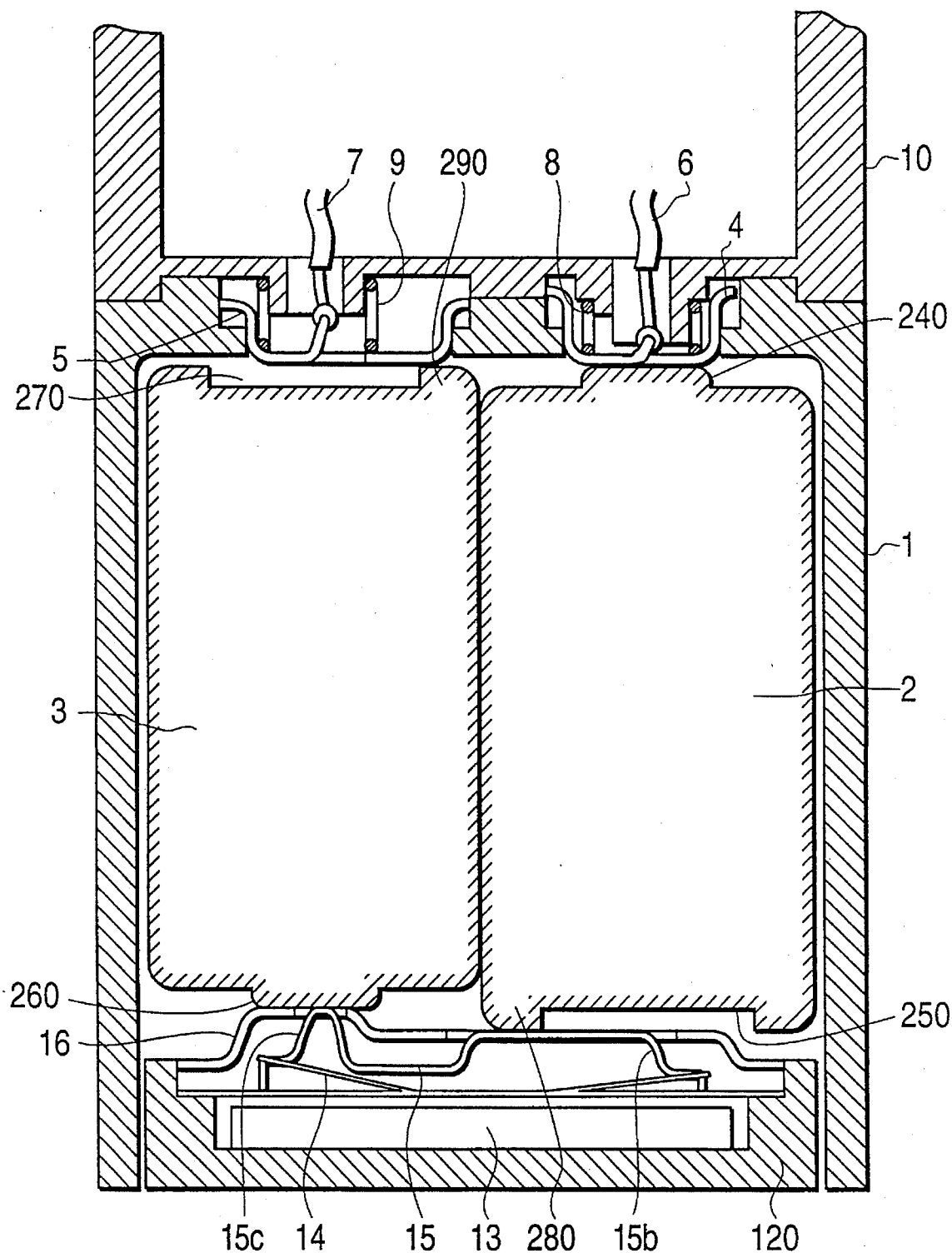
FIG. 10 is a diagram illustrating a vertical cross section along line III—III of the battery housing device of FIG. 4, wherein the batteries are incorrectly loaded to be upside down.

FIG. 10 is a diagram illustrating a vertical cross section along line III—III of the battery housing device of FIG. 4, wherein the batteries are incorrectly loaded to be upside down. As illustrated in FIG. 10, the incorrect insertion position of battery 2 causes a nonconductive part 280 on the perimeter of negative electrode 250 of battery 2 to interfere with, and press down, protuberance 15b of continuity plate 15. As a result, continuity is not made with negative electrode 250 of battery 2. Moreover, the incorrect insertion position of battery 3 causes a nonconductive part 290 on the perimeter of negative electrode 270 of battery 3 to interfere with, and press up on, notched piece 5. As a result, continuity is not made with negative electrode 270 of battery 3. Therefore, electrical contact is not made, unless batteries 2 and 3 are properly inserted. In this manner, improper insertion of batteries 2 and 3 can be prevented.

According to embodiments of the present invention, contact can be maintained between electrodes of a battery and a continuity plate even if, for example, the batteries move inside the battery housing chamber from shock or vibration.

According to embodiments of the present invention, the size of a protruding part (for example, see protuberance 15b in FIG. 10) provides continuity with the positive electrode of a battery. This protruding part is made to be a size which contacts a nonconductive part (for example, see non-conductive part 280 in FIG. 10) of the perimeter of the negative electrode of the battery when the battery is incorrectly loaded into the battery housing chamber. Thus, continuity is not made between electrodes of a battery and a continuity plate of the battery housing chamber if the battery is loaded backwards. Therefore, a device connected to the battery housing chamber will not be supplied with power when the batteries are incorrectly loaded.

According to embodiments of the present invention, a continuity plate of a battery housing chamber is movably supported in the direction that links the positive and negative electrodes of the batteries (that is, the "thrust" direction of the batteries). As a result, the batteries and the continuity plate have continuity in relation to vibration and shock.

The above embodiments of the present invention relate to batteries connected in series. However, the present invention is also applicable to a battery housing device for connecting batteries in parallel. Thus, embodiments of the present invention are applicable to a battery housing device with a battery housing chamber which holds any number of batteries in either a series connection, a parallel connection, or a combination of parallel-series connections.

Embodiments of the present invention can be applied to virtually any device which uses batteries to supply power to components therein. For example, embodiments of the present invention can be applied to a camera so that a photographer can determine whether or not the batteries are correctly loaded into the camera.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A battery housing device comprising:
   a battery housing chamber having an opening and which houses a battery having an electrode;
   a cover for closing the opening in the chamber, the cover comprising
   an electrically conductive plate for electrically contacting one of the positive electrode and the negative electrode of a battery housed in the chamber, and
   a spring plate secured to the cover and supporting the electrically conductive plate to be movable along a straight line path extending through the positive electrode and the negative electrode of the battery, to compensate for movement of the battery inside the chamber.

2. A battery housing device as in claim 1, wherein the spring plate of the cover is secured to the cover at a first position and is between the electrically conductive plate and the first position, the cover further comprising:
   a retaining plate secured to the cover with the electrically conductive plate and the spring plate being between the retaining plate and the first position, the retaining plate limiting the motion of the electrically conductive plate along the straight line path.

3. A battery housing device as in claim 1, wherein the electrically conductive plate of the cover has a shape which allows the electrically conductive plate to electrically contact the positive electrode of the battery when the battery is housed in the chamber with the positive electrode adjacent to the electrically conductive plate, and which does not allow the electrically conductive plate to electrically contact the negative electrode of the battery when the battery is housed in the chamber with the negative electrode adjacent to the electrically conductive plate, thereby preventing electrical contact between the electrically conductive plate and the battery when the battery is incorrectly positioned in the chamber.

4. A battery housing device as in claim 2, wherein the electrically conductive plate of the cover has a shape which allows the electrically conductive plate to electrically contact the positive electrode of the battery when the battery is housed in the chamber with the positive electrode adjacent to the electrically conductive plate, and which does not allow the electrically conductive plate to electrically contact the negative electrode of the battery when the battery is housed in the chamber with the negative electrode adjacent to the electrically conductive plate, thereby preventing electrical contact between the electrically conductive plate and the battery when the battery is incorrectly positioned in the chamber.

5. A battery housing device comprising:

a battery housing chamber having an opening and which houses more than one battery, each battery having a positive electrode and a negative electrode and a straight line path extending through the positive electrode to the negative electrode of the battery, each battery housed in the chamber so that the straight line path of the respective battery is parallel to the straight line path of the other batteries of the more than one battery housed in the chamber;

a cover for closing the opening in the chamber, the cover comprising an electrically conductive plate for electrically contacting one of the positive electrode and the negative electrode of each battery housed in the chamber to electrically connect each battery together, and a spring plate secured to the cover and supporting the electrically conductive plate to be movable along the straight line path of each battery, to compensate for movement of the more than one battery inside the chamber.

6. A battery housing device as in claim 5, wherein the spring plate of the cover is secured to the cover at a first position and is between the electrically conductive plate and the first position, the cover further comprising:

a retaining plate secured to the cover with the electrically conductive plate and the spring plate being between the retaining plate and the first position, the retaining plate limiting the motion of the electrically conductive plate along the straight line path of each battery.

7. A battery housing device as in claim 5, wherein the electrically conductive plate of the cover has a shape which allows the electrically conductive plate to electrically contact the positive electrode of a respective battery of the more than one battery when the respective battery is housed in the chamber with the positive electrode adjacent to the electrically conductive plate, and which does not allow the electrically conductive plate to electrically contact the negative electrode of the respective battery when the respective battery is housed in the chamber with the negative electrode adjacent to the electrically conductive plate, thereby preventing electrical contact between the electrically conductive plate and the respective battery when the respective battery is incorrectly positioned in the chamber.

8. A battery housing device as in claim 6, wherein the electrically conductive plate of the cover has a shape which allows the electrically conductive plate to electrically contact the positive electrode of a respective battery of the more than one battery when the respective battery is housed in the chamber with the positive electrode adjacent to the electrically conductive plate, and which does not allow the electrically conductive plate to electrically contact the negative electrode of the respective battery when the respective battery is housed in the chamber with the negative electrode adjacent to the electrically conductive plate, thereby preventing electrical contact between the electrically conductive plate and the respective battery when the respective battery is incorrectly positioned in the chamber.

9. A battery housing device comprising:

a battery housing chamber having an opening and which houses a battery having an electrode;

a cover for closing the opening in the chamber, the cover comprising a contact member for electrically contacting the electrode of a battery housed in the chamber, and an elastic member secured to the cover and supporting the contact member to be movable to compensate for movement of the battery inside the chamber, wherein the battery has a positive electrode and a negative electrode, the elastic member of the cover supports the contact member to be movable along a straight line path extending through the positive electrode and the negative electrode of the battery, and the elastic member of the cover is a spring plate.

10. A battery housing device comprising:

a battery housing chamber having an opening and which houses a battery having an electrode;

a cover for closing the opening in the chamber, the cover comprising a contact member for electrically contacting the electrode of a battery housed in the chamber, and an elastic member secured to the cover and supporting the contact member to be movable to compensate for movement of the battery inside the chamber, wherein the battery has a positive electrode and a negative electrode, the elastic member of the cover supports the contact member to be movable along a straight line path extending through the positive electrode and the negative electrode of the battery, the contact member of the cover is an electrically conductive plate, and the elastic member of the cover is a spring plate.

11. A battery housing device as in claim 10, wherein the battery has a positive electrode and a negative electrode and the contact member of the cover has a shape which allows the contact member to electrically contact the positive electrode of a battery housed in the chamber with the positive electrode adjacent to the contact member, and which does not allow the contact member to electrically contact the negative electrode of a battery housed in the chamber with the negative electrode adjacent to the contact member, thereby preventing electrical contact between the contact member and the battery when the battery is incorrectly positioned in the chamber.

12. A battery housing device as in claim 11, wherein the contact member of the cover has a protuberance which allows electrical contact with the positive electrode of the battery and does not allow electrical contact with the negative electrode of the battery.

13. A battery housing device comprising:

a battery housing chamber having an opening and which houses a battery having an electrode;

a cover for closing the opening in the chamber, the cover comprising a contact member for electrically contacting the electrode of a battery housed in the chamber, and an elastic member secured to the cover and supporting the contact member to be movable to compensate for movement of the battery inside the chamber, wherein the battery has a positive electrode and a negative electrode and the contact member of the cover has a shape which allows the contact member to electrically contact the positive electrode of a battery housed in the chamber with the positive electrode adjacent to the contact member, and which does not allow the contact member to electrically contact the negative electrode of a battery housed in the chamber with the negative electrode adjacent to the contact member, thereby preventing electrical contact between the contact member and the battery when the battery is incorrectly positioned in the chamber.

14. A battery housing device as in claim 13, wherein the contact member of the cover has a protuberance which allows electrical contact with the positive electrode of the battery and does not allow electrical contact with the negative electrode of the battery.

15. A battery housing device comprising:

a battery housing chamber having an opening and which houses a battery having an electrode;

a cover for closing the opening in the chamber, the cover comprising a contact member for electrically contacting the electrode of a battery housed in the chamber, and an elastic member secured to the cover and supporting the contact member to be movable to compensate for movement of the battery inside the chamber, wherein the battery has a positive electrode and a negative electrode, the elastic member of the cover supports the contact member to be movable along a straight line path extending through the positive electrode and the negative electrode of the battery, and the elastic member of the cover is secured to the cover at a first position and is between the contact member and the first position, the cover further comprising a retaining plate secured to the cover with the contact member and the elastic member being between the retaining plate and the first position, the retaining plate limiting the motion of the contact plate along the straight line path.

* * * * *